United States Patent [19]
Moyer et al.

[11] Patent Number: 5,443,731
[45] Date of Patent: Aug. 22, 1995

[54] PROCESS FOR EXTRACTING TECHNETIUM FROM ALKALINE SOLUTIONS

[75] Inventors: Bruce A. Moyer, Oak Ridge; Richard A. Sachleben; Peter V. Bonnesen, both of Knoxville, all of Tenn.

[73] Assignee: The United States of America as represented by the United States Department of Energy, Washington, D.C.

[21] Appl. No.: 278,211

[22] Filed: Jul. 21, 1994

[51] Int. Cl.6 .............................................. B01D 11/00
[52] U.S. Cl. ...................... 210/634; 210/638; 210/639; 423/2; 423/10; 423/49; 423/157
[58] Field of Search ............... 210/634, 638, 639, 682, 210/759; 423/2, 10, 49, 157

[56] References Cited

U.S. PATENT DOCUMENTS

| | | | |
|---|---|---|---|
| 3,827,986 | 8/1974 | Chalton et al. | 423/2 |
| 4,162,231 | 7/1979 | Horwitz et al. | 423/2 |
| 4,208,377 | 6/1980 | Horwitz et al. | 423/8 |
| 4,654,173 | 3/1987 | Walker et al. | 423/49 |
| 5,028,402 | 7/1991 | Foos et al. | 423/8 |
| 5,100,585 | 3/1992 | Horwitz et al. | 210/682 |
| 5,110,474 | 5/1992 | Horwitz et al. | 210/634 |
| 5,169,609 | 12/1992 | Horwitz et al. | 423/49 |
| 5,344,623 | 9/1994 | Horwitz et al. | 423/2 |

OTHER PUBLICATIONS

Horwitz, E. P. et al. "SREX: A New Process for the Extraction and Recovery of Strontium from Acidic Waste Streams" Solvent Extraction and Ion Exchange, 9(1) 1–25 (1991).

Jalhoom, M. G. "Extraction of Technetium by Crown Ethers and Cryptands" J. Radioanal. Nucl. Chem. Letters 104(3) 131–140 (1986).

Korpusov, G. V. et al "Extraction of Technetium by Dicyclohexyl-18-Crown-6" Sov. Radiochem. 26(3) 390–392 (1984), May 11, 1983.

Schulz, W. W. "Cyclohexanone Solvent Extraction of 99TcO4 from Alkaline Nuclear Waste Solutions" Nuclear Processes. Session 14 60–106 (1980).

*Primary Examiner*—Robert A. Dawson
*Assistant Examiner*—Ana M. Fortuna
*Attorney, Agent, or Firm*—Emily C. Green; Stephen D. Hamel; William R. Moser

[57] ABSTRACT

A process for extracting technetium values from an aqueous alkaline solution containing at least one alkali metal hydroxide and at least one alkali metal nitrate, the at least one alkali metal nitrate having a concentration of from about 0.1 to 6 molar. The solution is contacted with a solvent consisting of a crown ether in a diluent for a period of time sufficient to selectively extract the technetium values from the aqueous alkaline solution. The solvent containing the technetium values is separated from the aqueous alkaline solution and the technetium values are stripped from the solvent.

15 Claims, 1 Drawing Sheet

PROCESS FOR EXTRACTING TECHNETIUM FROM ALKALINE SOLUTIONS

BACKGROUND OF THE INVENTION

This invention relates generally to a process for extracting technetium from nuclear wastes and more particularly to a process for extracting technetium from alkaline waste solutions containing technetium and high concentrations of alkali metal nitrates. The United States has rights to this invention pursuant to Contract No. DE-ACO5-840R21400 with Martin Marietta Energy Systems, Inc., awarded by the U.S. Department of Energy.

Fission products resulting from the irradiation of nuclear reactor fuels require long-term storage in an insoluble form. Approximately 1.8 metric tons of technetium is contained in 60 million gallons of high-level radioactive wastes stored at Hanford, Wash. These wastes are highly alkaline ($pH \geq 13$) and are highly concentrated in alkali metal nitrates, such as sodium nitrate. Removal of technetium from such wastes is warranted because of safety considerations in waste processing and environmental risks associated with long-term storage of the waste. In addition, these wastes provide a resource from which technetium can be recovered for experimental uses and other applications.

Several processes have been developed to extract technetium from nuclear waste solutions which are strongly acidic. One process focused on recovering palladium and technetium values by contacting the acidic waste solution with an extractant of tricaprylmethylammonium nitrate (sold under the trademark Aliquat ® 336, Henkel Corporation, Tucson, Ariz.) in an inert hydrocarbon diluent to extract palladium and technetium from the waste solution. The palladium and technetium values were then recovered from the extractant with a strong nitric acid strip solution. Although this method is useful with acidic solutions, its application to the recovery of technetium from alkaline waste solutions requires stripping by means of nitric acid, which is not particularly safe nor economical.

Another method used cyclohexanone to extract technetium from alkaline media. This process is limited, however, in that cyclohexanone is somewhat toxic, fairly volatile (BP 155.6° C., flashpoint 46° C.), and significantly water soluble (50 grams per liter at 30° C.), thus making this diluent less suitable for use in extracting technetium. Other disadvantages of cyclohexanone include appreciable co-extraction of nitrate salts and known emulsion problems in stripping.

Other techniques have used macrocyclic polyethers ("crown ethers") to extract technetium from strongly acidic waste solutions. One method used a crown ether in a water-insoluble diluent to extract strontium and technetium from nitric acid waste solutions which were up to 6 molar in nitric acid. A related method involved separating strontium and technetium from a waste solution by first preparing a 2–6 M nitric acid sample solution comprising dissolved strontium and technetium in a waste solution and then passing the nitric acid sample solution through a chromatographic separation column comprising a solution of a crown ether in a water-insoluble diluent. Because these methods require a nitric acid solution or call for pretreatment of the solution with nitric acid, they neither describe nor suggest that these techniques may be applied to extracting technetium from alkaline solutions highly concentrated in alkali metal nitrates.

Some work has dealt with the use of crown ethers to extract technetium under alkaline conditions. One study examined the extraction of technetium from alkaline media using dibenzo-18-crown-6 and discussed the effects of crown cavity size, substitutions, and type of base on the distribution coefficient of technetium. Another study investigated the extraction of technetium by solutions of dicyclohexyl-18-crown-6 in trichlorobenzene as a function of nitric acid, potassium hydroxide, and crown ether concentrations. Neither of these studies, however, addressed how high concentrations of alkali metal nitrates such as sodium nitrate in the alkaline media would affect the distribution coefficient of technetium. As will be discussed later, it has been found that the concentration of sodium nitrate in the alkaline waste solution plays a key role in determining the efficiency of extraction and stripping.

Accordingly, a need in the art exists for a method of extracting technetium from alkaline waste solutions that does not require acidification of the media, uses suitable diluents, and works efficiently in the presence of high concentrations of alkali metal nitrates.

SUMMARY OF THE INVENTION

In view of the above need, it is an object of this invention to provide a process for extracting technetium values from aqueous alkaline waste solutions containing a high concentration of alkali metal nitrates.

Another object of this invention is to provide a process as in the above object that uses suitable diluents.

Further, it is an object of this invention to provide a process as in the above objects that does not require acidification of the aqueous alkaline solution.

It is another object of this invention to provide a process as in the above objects that works efficiently in the presence of a high concentration of alkali metal nitrates.

Briefly, the present invention is a process for extracting technetium values from an aqueous alkaline solution, comprising the steps of: contacting the aqueous alkaline solution containing at least one alkali metal hydroxide and at least one alkali metal nitrate with a solvent consisting of a crown ether in a diluent for a period of time sufficient to selectively extract the technetium values from the aqueous alkaline solution into the solvent, the at least one alkali metal nitrate having a concentration of from about 0.1 to 6 molar and the diluent being a water-immiscible organic liquid in which the crown ether is soluble; separating the solvent containing the technetium values from the aqueous alkaline solution; and stripping the technetium values from the solvent by contacting the solvent with water.

Additional objects, advantages, and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

BRIEF DESCRIPTION OF THE DRAWINGS

FIG. 1, which includes FIGS. 1B-1E represent specific embodiments of dibenzo-14-crown-4 ethers used in accordance with the present invention.

DETAILED DESCRIPTION

Technetium values contained in the aqueous alkaline waste solutions are in the heptavalent oxidation state, the most common oxidation state of technetium in waste media. The chemical form of heptavalent technetium is the oxo-anion $TcO_4^-$ (pertechnetate). The crown ethers complex cationic metal species such as sodium ($Na^+$) by coordination of the ether oxygens to the metal ion. To preserve electroneutrality, an anionic counterion must accompany the cationic crown ether-metal complex, and in this manner, extraction of pertechnetate is believed to occur. Owing to the abundance of $Na^+$ ions, as well as $K^+$ ions in the waste solution, the extraction process of the present invention is especially suited for waste treatment.

Crown ethers useful for this process include, but are not limited to, any ring sizes 12-crown-4, 13-crown-4, 14-crown-4, 15-crown-5, 16-crown-4, 16-crown-5, 18-crown-6, 19-crown-6, 20-crown-6, 21-crown-7, or 24-crown-8 (or larger). These rings can additionally have various other functionalities attached to them, including but not limited to benzene rings (benzocrowns), cyclohexyl rings (cyclohexylcrowns), alkyl groups (e.g., t-butyl or t-octyl groups), or hydroxyl, ketone, ether, phosphoryl, sulfoxide, amide, or pyridine substituents, or any combination thereof. Crown ethers containing hydrocarbon substituents are especially suitable because they partition weakly to aqueous solutions and thus are more amenable to extended reuse of the extraction solvent.

The concentration of crown ether employed is chosen in accordance with the desired level of technetium extraction for a given diluent and modifier subject to the need to minimize costs. Suitable diluents are those organic liquids which possess low toxicity, low volatility, and low solubility in an aqueous solution. In the process of the present invention, improved efficiency of technetium extraction is obtained by using new dibenzo-14-crown-4 ethers which exhibit increased $Na^+$ binding strength, increased selectivity for technetium, and increased solubility in suitable diluents when compared to crown ethers of general commercial availability. This increased selectivity for technetium and increased solubility allow for the use of solvents containing diluent/crown ether combinations and concentrations not previously described in the prior art.

Figure 1A:
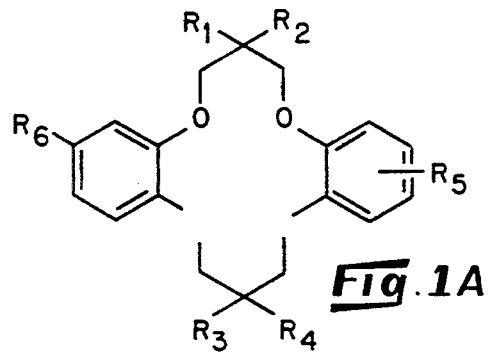
FIGS. 1A–1E, is a skeleton-type structural scheme of a family of crown ethers used in the course of the present invention. The crown ether shown in FIG. 1A is a dibenzo-14-crown-4 ether with functional groups $R_1$-$R_6$ attached.
Figure 1B:
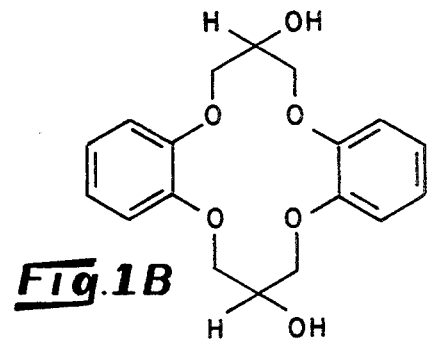
Figure 1C:
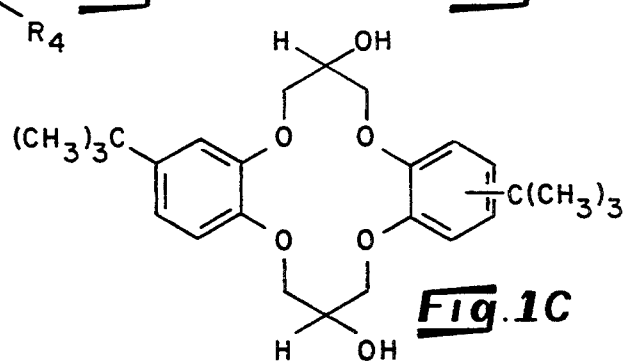
Figure 1D:
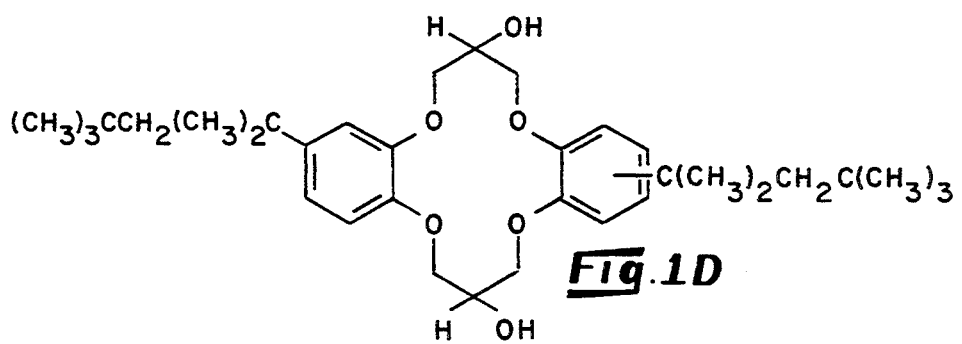
Figure 1E:
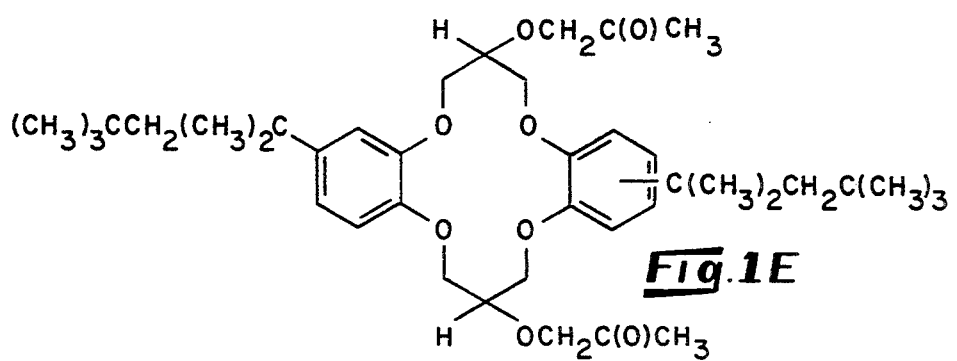

Using the structure shown in FIG. 1A as a platform for derivative modifications, the new dibenzo 14-crown-4 ethers of the present invention are believed to be capable of binding sodium ion more tightly than commercially available crown ethers. As a result, this family of crown ethers increases the overall efficiency of technetium extraction. In addition, suitable modifications to the dibenzo-14-crown-4 ether platform can result in improved selectivity for technetium over nitrate. The rejection of nitrate is important because it is present at concentrations of $10^4$ to $10^6$ times that of pertechnetate. The higher the pertechnetate selectivity of the crown ether, the less nitrate is coextracted, resulting in more efficient removal of technetium values and regeneration of the extraction solution by stripping with water. Examples of the newly designed and synthesized crown ethers include sym-dihydroxydibenzo-14-crown-4 (FIG. 1B), bis(t-butylbenzo)-14-crown-4-diol (FIG. 1C), bis(t-octylbenzo)-14-crown-4-diol (FIG. 1D), and cis-sym-bis (t-octylbenzo)-14-crown-4-bis(oxyacetone) (FIG. 1E).

Suitable diluents in which the crown ethers are dissolved include aromatic hydrocarbon, aliphatic hydrocarbon, ketone, pyridine, ether, nitrile, phosphoryl, or alcohol solvents which are additionally water-immiscible and inert, such as but not limited to, diisopropyl benzene, ortho-xylene, aromatic and aliphatic kerosenes, dodecane, 2-octanone, 4-(1-butylpentyl)pyridine, anisole, benzonitrile, tributylphosphate, 1-octanol, or any combination of these in any proportion. The crown ethers are typically dissolved in the diluent at concentrations ranging from about $1.0 \times 10^{-4}$ molar to 5 molar, with about 0.04 molar being an acceptable concentration. The diluent can additionally contain added organic substances which function as modifiers or synergists. These include, but are not limited to, aromatic hydrocarbons, aliphatic hydrocarbons, ketones, pyridines, amines, amides, ethers, nitriles, sulfoxides, phosphoryl compounds (includes, for example, phosphine oxides and the alkyl esters of phosphoric, phosphonic, and phosphinic acids), fluorocarbons, and alcohols. The modifier is typically present in the diluent at a concentration ranging from about 0.01 molar to about 2 molar, with about 1.0 molar being preferred. The typical range of the added modifier is from about 0.5 to 50 percent by volume.

To extract technetium values using a solvent formulated as described above consisting of a crown ether in a diluent, the solvent must be directly contacted with an immiscible aqueous solution containing technetium values at any concentration under appropriate conditions. The aqueous feed solution, in addition to containing technetium, may also be highly alkaline, with pH values being above 8, as well as being highly concentrated (preferably 1 to 6 molar) in salts formed by the reaction of alkali or alkaline-earth hydroxides with mineral acids. Such salts may include, but are not limited to, sodium nitrate, potassium nitrate, sodium chloride, sodium sulfate, strontium nitrate, and cesium nitrate. The main requirement is the presence of a salt whose cation is strongly bound by the crown ether.

Using crown ethers to extract technetium from alkaline solutions also has the advantage of economical and waste-reducing stripping with water. Stripping can be accomplished by simply contacting the solvent, loaded with the crown ether-sodium pertechnetate complex, with pure water, using any technique known to those skilled in the art. Preferably more than one contact with water is employed, depending on the desired degree of stripping.

EXAMPLES

The following examples are given to illustrate the process of the invention and are not to be taken as limiting the scope of the invention which is defined in the appended claims.

The following methods were employed in the procedures described in the succeeding Examples. The crown ethers dicyclohexano-18-crown-6, 4-t-butylcyclohexano-15-crown-5 and bis-4,4'(5')[(t-butyl)cyclohexano]-18-crown-6 were obtained from Parish Chemical Company, Vineyard, Utah, and used without further purification. The crown ethers cis-sym-bis(t-butylbenzo)-14-crown-4-diol and cis-sym-bis(t-octylbenzo)-14-crown-4bis(oxyacetone) were synthesized at Oak Ridge National Laboratory as follows: The parent compound sym-dihydroxydibenzo-14-crown-4 (FIG. 1B), was prepared using literature methods. The crowns bis(t-butylbenzo)-14-crown-4-diol, (FIG. 1C), and bis(t-octylbenzo)-14-crown-4-diol, (FIG. 1D) were prepared by a modification of a synthesis of FIG. 1B, using t-butyl catechol and t-octyl catechol, respectively. FIG. 1D was also prepared by an alternate method involving the Friedel-Crafts alkylation (2,4,4-trimethylpentene/-trifluoroacetic acid) of FIG. 1B. Improved methods for the separation of the cis (shown) and trans (not shown) isomers of FIGS. 1B-1D have also been investigated. FIG. 1E, cis-sym-bis(t-octylbenzo)-14-crown-4-bis(oxyacetone), was prepared in two steps from FIG. 1D. Specifically, FIG. 1D was converted to its corresponding bis-methallyl ether (i.e. 2-methylpropenyl ether) which upon oxidative cleavage with $OsO_4/NaIO_4$ gave the bis-ketone, FIG. 1E.

All diluents and modifiers were analytical grade and used without further purification. Kermac® 627 (a kerosene with approximately 21% aromatic/79% aliphatic content) was obtained from Kerr McGee, Oklahoma City, Okla., and Isopar® M (a completely aliphatic isoparaffinic kerosene) was obtained from Exxon Chemical Company, Houston, Tex. Aliquat® 336 nitrate was prepared from the parent Aliquat® 336 chloride, which was obtained from Henkel Corporation, Tucson, Ariz.

EXAMPLE 1

A synthetic waste solution consisting of $^{99}TcO_4^-$ $6.0 \times 10^{-5}M$, NaOH at 0.1M, and sodium nitrate at 5.0M was prepared and contacted with an equal volume of dicyclohexano-18-crown-6 (DCH18C6 0.10M in 1-octanol) for one hour at 25° C. in sealed borosilicate vials by end-over-end rotation at about 30 RPM. After allowing the phases to coalesce, aliquots of the aqueous and organic phases were removed, and the $^{99}Tc$ activity in each phase was determined by standard beta liquid scintillation counting techniques. An aliquot of the aqueous phase from the first contact was contacted with an equal volume of fresh extractant solution in the manner described above, and aliquots were removed to determine $^{99}Tc$ activity. After two contacts, 81% of the technetium present in the aqueous feed was extracted. Aliquots of the first and second contacts were combined and contacted with an equal volume of distilled, deionized water, in the manner described above. The $^{99}Tc$ activity in each phase was again determined, and the organic phase from this first stripping operation was contacted with a second equal volume of water, comprising the second strip. As shown in Table 1, after two contacts $\geq 99\%$ of the technetium present in the loaded organic phase was removed.

EXAMPLE 2

A synthetic waste solution consisting of $^{99}TcO_4^-$ at $6.0 \times 10^{-5}M$, NaOH at 0.1M, and sodium nitrate at 5.0M was prepared and contacted with an equal volume of DCH18C6 and 4-t-butylcyclohexanone (0.15M and 1.00M respectively, in 1:1 1-octanol/dodecane) for one hour at 25° C. in sealed vials by end-over-end rotation at about 30 RPM. Two extraction contacts followed by two stripping contacts, performed in the manner described in Example 1, resulted in removal of 98% of the technetium from the aqueous feed and removal of >99% of the technetium from the loaded organic solution (see Table 1).

EXAMPLE 3

A synthetic waste solution consisting of $^{99}TcO_4^-$ at $6.0 \times 10^{-5}M$, NaOH at 0.1M, and sodium nitrate at 5.0M was prepared and contacted with an equal volume of cis-sym-bis(t-octylbenzo)-14-crown-4-diol (BOB14C4-diol, FIG. 1C, 0.10M in ortho-xylene) for one hour at 25° C. in sealed vials by end-over-end rotation at about 30 RPM. Two extraction contacts followed by two stripping contacts, performed in the manner described above, resulted in the removal of 89% of the technetium from the aqueous feed and removal of $\geq 99\%$ of the technetium from the loaded organic extractant solution (see Table 1).

EXAMPLE 4

A synthetic waste solution consisting of $^{99}TcO_4^-$ at $6.0 \times 10^{-5}M$, NaOH at 0.1M, and sodium nitrate at 5.0M was prepared and contacted with an equal volume of BOB14C4-diol and 4-t-butylcyclohexanone (0.1M and 1.00M, respectively, in Kermac® 627) for one hour at 25° C. in sealed vials by end-over-end rotation at about 30 RPM. Two extraction contacts followed by two stripping contacts, performed in the manner described above, resulted in the removal of 96% of the technetium from the aqueous feed and removal of $\geq 99\%$ of the technetium from the loaded organic extractant solution (see Table 1).

EXAMPLE 5

A synthetic waste solution consisting of $^{99}TcO_4^-$ at $6.0 \times 10^{-5}M$ in a complex waste simulant containing sodium (7.0M), potassium (0.95M), aluminum (0.72M), cesium ($7.0 \times 10^{-5}M$), nitrate (3.52M), nitrite (1.51M), carbonate (0.15M), chloride (0.10M), phosphate (0.014M), and sulfate (0.008M), and having a pH>14 (1.75M in hydroxide) was prepared. This waste simulant, hereinafter referred to as "complex waste simulant", was modeled after Hanford tank 101-AW double-shell slurry feed. The complex waste simulant was contacted with an equal volume of 4-t-butylcyclohexano-15-crown-5 (4-t-BuCH15C5, 0.04M in 2:1 2-octanone/Isopar® M) for one hour at 25° C. in sealed vials by end-over-end rotation at about 40 RPM. Two extraction contacts followed by two stripping contacts, performed in the manner described in Example 1, resulted in removal of 93% of the technetium from the aqueous feed and removal of >99% of the technetium from the loaded organic extractant solution (See Table 2).

EXAMPLE 6

A synthetic waste solution consisting of $^{99}TcO_4^-$ at $6.0 \times 10^{-5}M$ in the complex waste solution described in Example 5 was contacted with an equal volume of bis-4,4'(5')[(t-butyl)cyclohexano]-18-crown-6 (di-t-BuCH18C6, 0.04M in 2:1 2-octanone/Isopar® M) for one hour at 25° C. in sealed vials by end-over-end rotation at about 40 RPM. Two extraction contacts followed by two stripping contacts, performed in the manner described in Example 1, resulted in removal of 99% of the technetium from the aqueous feed and removal of 98% of the technetium from the loaded organic extractant solution (see Table 2).

EXAMPLE 7

A synthetic waste solution consisting of $^{99}TcO_4^-$ at $6.0 \times 10^{-5}M$ in the complex waste solution described in Example 5 was contacted with an equal volume of cis-sym-bis(t-octylbenzo)-14-crown-4-bis(oxyacetone) (BOB14C4-bis(oxyacetone), FIG. 1E, 0.04M in 1:1 4-(1-butylpentyl)pyridine/Isopar ® M) for one hour at 25° C. in sealed vials by end-over-end rotation at about 40 RPM. Two extraction contacts followed by two stripping contacts, performed in the manner described in Example 1, resulted in removal of >99% of the technetium from the aqueous feed and removal of >99% of the technetium from the loaded organic extractant solution (see Table 2).

As shown in Tables 1–3, a comparison of the use of crown ethers with prior art extraction methods demonstrates that the crown ethers offer an improvement with regard to both extraction and stripping with water of technetium from aqueous alkaline solutions containing a high concentration of sodium nitrate. A comparison of the use of crown ethers with Aliquat ® 336 nitrate (tricaprylmethylammonium nitrate) under the same conditions as Examples 2 through 4 (see Table 3) shows that, although the degree of extraction of technetium using this material is comparable to that of the crown ethers, efficient stripping is not possible using water, but instead requires 8M nitric acid as described in the prior art. In addition, a comparison of the use of crown ethers with the use of cyclohexanone alone as an extractant of technetium from alkaline media shows that, while the degree of technetium extraction was comparable to that of the crown ethers (in Examples 2 and 4) under the same extraction conditions, the degree of technetium removal via stripping was not as good (see Table 3). Moreover, as mentioned earlier, cyclohexanone has several disadvantages in that it is toxic, volatile, and has a high solubility in water.

Use of BOB14C4-bis(oxyacetone), Example 7, Table 2, shows a marked improvement over the prior art. This newly synthesized crown ether is capable of recovering about 99.8% of the technetium present in the feed solution after two contacts and recovery of about 99.9% of technetium after stripping of the loaded solution. The $^{99}$Tc distribution coefficient obtained from the use of 0.04M BOB14C4-bis(oxyacetone) (D $^{99}$Tc=24.96±0.62, corresponding to 99.85% technetium removal after two contacts) was more than an order of magnitude greater than the highest $^{99}$Tc distribution coefficient described in the prior art method which used 0.20M di-t-BuCH18C6 to extract technetium from aqueous nitric acid solutions (D $^{99}$Tc was 1.85, corresponding to 87.7% technetium removal after two contacts).

TABLE 1

Extraction of Pertechnetate by Various Crown Ether/Modifier/Diluent Systems from 0.1 M NaOH, 5 M NaNO₃, and Stripping by Back-Extraction Using Water

| Example Number | System: Crown Ether (M) Modifier (M) Diluent | Total % Extracted (2 contacts) [D $^{99}$Tc] | Total % Stripped (2 contacts) |
|---|---|---|---|
| 1 | DCH18C6 (0.1) none 1-octanol | 81.23 ± 0.28 [1.308 ± 0.019] | 99.35 ± 0.54 |
| 2 | DCH18C6 (0.15) 4-t-butyl-cyclohexanone (1.0) 1:1 1-octanol/dodecane | 97.57 ± 0.02 [5.417 ± 0.056] | 99.87 ± 0.00 |
| 3 | BOB14C4-diol (0.1) none ortho-xylene | 89.42 ± 0.15 [2.075 ± 0.037] | 99.75 ± 0.01 |
| 4 | BOB14C4-diol (0.1) 4-t-butyl-cyclohexanone (1.0) Kermac ® 627 | 95.84 ± 0.03 [3.904 ± 0.050] | 99.05 ± 0.08 |
| Control | none 4-t-butyl-cyclohexanone (1.0) 1:1 1-octanol/dodecane | 0.83 ± 0.08 [4.18 ± 0.70 × 10⁻³] | ≈99 |

TABLE 2

Extraction of Pertechnetate by Various Crown Ether/Modifier/Diluent Systems from "Complex Waste Simulant", and Stripping by Back-Extraction Using Water

| Example Number | System: Crown Ether (M) Modifier (M) Diluent | Total % Extracted (2 contacts) [D $^{99}$Tc] | Total % Stripped (2 contacts) |
|---|---|---|---|
| 5 | 4-t-BuCH15C5 (0.04) none 2:1 2-octanone/Isopar ® M | 93.17 ± 0.18 [2.843 ± 0.389] | 99.98 ± 0.01 |
| 6 | di-t-BuCH18C6 (0.04) none 2:1 2-octanone/Isopar ®M | 99.33 ± 0.03 [11.28± 1.05] | 98.15 ± 0.75 |
| 7 | BOB14C4-bis(oxyacetone) (0.04) none 1:1 4-(1-butylpentyl)-pyridine/Isopar ® M | 99.85 ± 0.00 [24.96 ± 0.62] | 99.93 ± 0.01 |

TABLE 3

Extraction of Pertechnetate by Various Prior Art Systems from 0.1 M NaOH, 5 M NaNO₃, and Stripping by Back-Extraction Using Water

| Prior Art System | Total % Extracted (2 contacts) [D $^{99}$Tc] | Total % Stripped (2 contacts) |
|---|---|---|
| Aliquat 336 Nitrate (0.1 M in 1-octanol) | 81.72 ± 0.41 [1.339 ± 0.034] | 0.20 ± 0.01 |
| Cyclohexanone | 96.82 ± 0.02 [4.613 ± 0.053] | 84.44 ± 0.87 |

Although the process of the present invention was developed especially for the recovery of technetium values from alkaline tank waste highly concentrated in alkali metal nitrates, certain other anions could also be extracted from waste solutions using this method. Such anions include, but are not limited to, perrhenate, iodide, the haloanions of rhodium, iridium, palladium, platinum, silver, gold, and complex anions of the actinides. In addition, alkaline-earth cations and alkali-metal cations, such as $^{90}$Sr and $^{137}$Cs, could be coextracted using this procedure.

Thus, it will be seen that a process for extracting technetium values from aqueous alkaline waste solutions containing at least one alkali metal hydroxide and at least one alkali metal nitrate has been provided. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims attached to and forming a part of this specification.

We claim:

1. A process for extracting technetium values from an aqueous alkaline solution, comprising the steps of:
    contacting said aqueous alkaline solution containing at least one alkali metal hydroxide and at least one alkali metal nitrate with a solvent consisting of a crown ether in a diluent for a period of time sufficient to selectively extract said technetium values from said aqueous alkaline solution into said solvent, said at least one alkali metal nitrate having a concentration of from about 0.1 to 6 molar and said diluent being a water-immiscible organic liquid in which said crown ether is soluble;
    separating said solvent containing said technetium values from said aqueous alkaline solution; and
    stripping said technetium values from said solvent by contacting said solvent with water.

2. The process of claim 1 wherein the pH of said aqueous alkaline solution is above about 8.

3. The process of claim 2 wherein the concentration of said at least one alkali metal hydroxide is from about 1 micromolar to 10 molar.

4. The process of claim 3 wherein said at least one alkali metal hydroxide is a member selected from the group consisting of sodium hydroxide, potassium hydroxide, and mixtures thereof.

5. The process of claim 4 wherein said at least one alkali metal nitrate is a member selected from the group consisting of sodium nitrate, potassium nitrate, and mixtures thereof.

6. The process of claim 5 wherein the concentration of said crown ether in said diluent is from about $1.0 \times 10^{-4}$ molar to 5.0 molar.

7. The process of claim 6 wherein said diluent is an organic liquid selected from the group consisting of aromatic hydrocarbons, aliphatic hydrocarbons, ketones, pyridines, ethers, nitriles, phosphoryl compounds, alcohols, and mixtures thereof.

8. The process of claim 7 wherein said diluent further includes a modifier.

9. The process of claim 8 wherein said modifier is an organic compound selected from the group consisting of aromatic hydrocarbons, aliphatic hydrocarbons, ketones, pyridines, amines, amides, ethers, nitriles, sulfoxides, phosphoryl compounds, fluorocarbons, and alcohols.

10. The process of claim 9 wherein the concentration of said modifier in said diluent is from about 0.5 to 50 volume percent.

11. The process of claim 10 wherein said crown ether is selected from the group consisting of dicyclohexano-18-crown-6, 4-t-butylcyclohexano-15-crown-5, bis-4,4'(5')[( t-butyl)cyclohexano]-18-crown-6, and dicyclohexano-21-crown-7.

12. The process of claim 11 wherein said crown ether is a 14-crown-4 ether having the formula:

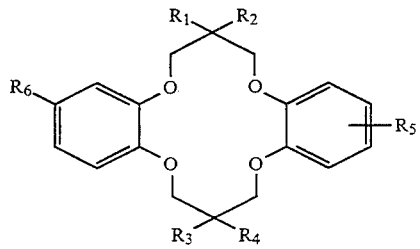

wherein $R_1$, $R_2$, $R_3$, and $R_4$ are the same or different and are selected from the group consisting of —H, —CH₃, alkyl, —OH, —OCH₃, —OCH₂CH₂OH, —OCH₂CH₂OCH₃, —OCH₂CH(CH₃)OCH₃, —OCH₂C(CH₃)₂OCH₃, —OCH₂CH(CH₃)₂, —OCH₂C(=CH₂)CH₃, —OCH₂CH₂P(O)(OBu)₂, —OCH₂C(CH₃)₂OH, —OCH₂C(O)CH₃, —OCH₂CH₂CH₂S(O)CH₃, —OCH₂C(O)NH₂, and —OCH₂-orthopyridine; and
wherein $R_5$ and $R_6$ are the same or different and are selected from the group consisting of —H, —C(CH₃)₃, and —C(CH₃)₂CH₂C(CH₃)₃.

13. The process of claim 12 wherein said crown ether is selected from the group consisting of cis-sym-bis(t-butylbenzo)-14-crown-4-diol, cis-sym-bis (t-octylbenzo)-14-crown-4-diol, and cis-sym-bis(t-octylbenzo)-14-crown-4-bis(oxyacetone).

14. The process of claim 13 wherein said crown ether is cis-sym-bis(t-octylbenzo)-14-crown-4-bis (oxyacetone).

15. The process of claim 12 wherein said crown ether has a cavity of a size such as to complex a sodium ion therein.

* * * * *